United States Patent
Signorini et al.

(10) Patent No.: US 11,582,333 B2
(45) Date of Patent: Feb. 14, 2023

(54) METHODS AND DEVICES IN A BLOCKCHAIN NETWORK

(71) Applicant: Nokia Technologies Oy, Espoo (FI)

(72) Inventors: Matteo Signorini, Palaiseau (FR); Matteo Pontecorvi, Palaiseau (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/499,958

(22) Filed: Oct. 13, 2021

(65) Prior Publication Data

US 2022/0131960 A1 Apr. 28, 2022

(30) Foreign Application Priority Data

Oct. 23, 2020 (EP) .................................... 20203582

(51) Int. Cl.
*G06F 15/16* (2006.01)
*H04L 69/28* (2022.01)
(Continued)

(52) U.S. Cl.
CPC ............ *H04L 69/28* (2013.01); *H04L 9/3236* (2013.01); *H04L 63/08* (2013.01); *H04L 69/03* (2013.01); *H04L 9/50* (2022.05); *H04L 67/104* (2013.01)

(58) Field of Classification Search
CPC ....... H04L 69/28; H04L 9/3236; H04L 63/08; H04L 69/03
(Continued)

(56) References Cited

U.S. PATENT DOCUMENTS

2018/0329783 A1 11/2018 Karame et al.
2019/0251199 A1 8/2019 Klianev et al.
(Continued)

FOREIGN PATENT DOCUMENTS

CN 111371768 A 7/2020
WO 2020/133333 A1 7/2020

OTHER PUBLICATIONS

Castro et al., "Authenticated Byzantine Fault Tolerance Without Public-Key Cryptography", Technical Report, 1999, pp. 1-12.
(Continued)

*Primary Examiner* — Duyen M Doan
(74) *Attorney, Agent, or Firm* — Fay Sharpe LLP (57) ABSTRACT

A first network device for use in a blockchain network is described. The first network device comprises
means for, while carrying out a first iteration of a consensus protocol involving a second node device (103), in response to a trigger event (3040), obtaining a time interval function of a time interval start trigger event (3040) and of a time interval end trigger event (3080), each event being linked to a message of the consensus protocol and wherein at least the end trigger event (3080) comprises receiving a message from the second node device;
means for transmitting (3083) first data (Delay_102) representative of said time interval to said second node device;
means for, during a subsequent iteration of said consensus protocol involving said second node device, receiving a message (3140) from said second node device, said message containing second data (DelayTX_102) representative of said time interval from said second node device;
means for authenticating said second node device as a function of said second data. A second network device, methods at the first and second network devices and a
(Continued)

computer readable medium with code for carrying out the methods are also described.

19 Claims, 6 Drawing Sheets

(51) Int. Cl.
  *H04L 9/32* (2006.01)
  *H04L 9/40* (2022.01)
  *H04L 69/00* (2022.01)
  *H04L 67/104* (2022.01)
  *H04L 9/00* (2022.01)

(58) Field of Classification Search
  USPC ............................................. 709/203
  See application file for complete search history.

(56) References Cited

U.S. PATENT DOCUMENTS

| | | | |
|---|---|---|---|
| 2020/0089523 A1* | 3/2020 | Cole | H04L 9/3236 |
| 2020/0192770 A1 | 6/2020 | Walid et al. | |
| 2020/0250655 A1 | 8/2020 | Naqvi et al. | |
| 2021/0073197 A1* | 3/2021 | Setty | G06F 16/2336 |
| 2021/0091926 A1* | 3/2021 | Ramaswamy | H04L 9/3239 |
| 2021/0099315 A1* | 4/2021 | Xu | H04L 9/3236 |

OTHER PUBLICATIONS

Daza et al., "CoLLIDE: CLoud Latency-based IDEntification", Procedia Computer Science, vol. 113, 2017, pp. 81-88.
Dou et al., "CLAS: A Novel Communications Latency Based Authentication Scheme", Security and Communication Networks, vol. 2017, 2017, pp. 1-20.
Nagarani et al., "Round Trip Latency Based Authentication Scheme in Fog-Enabled Cloud Computing System", International Journal of Recent Technology and Engineering (IJRTE), vol. 8, No. 2, Jul. 2019, pp. 1270-1278.
Salimitari et al., "A Survey on Consensus Protocols in Blockchain for IoT Networks", arXiv, Jun. 19, 2019, pp. 1-15.
Extended European Search Report received for corresponding European Patent Application No. 20203582.0, dated Mar. 12, 2021, 6 pages.
Castro et al., "Practical Byzantine Fault Tolerance", Proceedings of the Third Symposium on Operating Systems Design and Implementation, Feb. 1999, pp. 1-14.
MacKenzie et al., "An Assessment of Blockchain Consensus Protocols for the Internet of Things", International Conference on Internet of Things, Embedded Systems and Communications (IINTEC), Dec. 20-21, 2018, pp. 183-190.
Wan et al., "Recent advances in consensus protocols for blockchain: a survey", Wireless Networks, vol. 26, 2020, pp. 5579-5593.
Jalalzai et al., "An Experimental Evaluation of BFT Protocols for Blockchains", International Conference on Blockchain, 2019, pp. 34-48.
Brotsis et al., "On the Security of Permissioned Blockchain Solutions for IoT Applications", 6th IEEE Conference on Network Softwarization (NetSoft), Jun. 29-Jul. 3, 2020, pp. 465-472.

* cited by examiner

METHODS AND DEVICES IN A BLOCKCHAIN NETWORK

TECHNICAL FIELD

Methods and devices used in a blockchain network are described, in particular for authentication of nodes of this network.

BACKGROUND

Blockchain networks require that a consensus be established among participating nodes in order to accept or reject a transaction to be added to a blockchain. The consensus protocol may require numerous messages being exchanged among participating nodes. In order to secure these exchanges, authentication of nodes is required. While many authentication protocols exist, it may be desirable to have access to a lightweight protocol that allows devices with limited processing or power resources to act as nodes in the blockchain network.

SUMMARY

The scope of protection is set out by the independent claims. The embodiments, examples and features, if any, described in this specification that do not fall under the scope of the protection are to be interpreted as examples useful for understanding the various embodiments or examples that fall under the scope of protection.

One or more exemplary embodiments concern a first node device in a blockchain network, comprising:
- means for, while carrying out a first iteration of a consensus protocol involving a second node device, in response to a trigger event, obtaining a time interval function of a time interval start trigger event and of a time interval end trigger event, each event being linked to a message of the consensus protocol and wherein at least the end trigger event comprises receiving a message from the second node device;
- means for transmitting first data representative of said time interval to said second node device;
- means for, during a subsequent iteration of said consensus protocol involving said second node device, receiving a message from said second node device, said message containing second data representative of said time interval from said second node device;
- means for authenticating said second node device as a function of said second data.

According to one or more embodiments, the first data is representative of a plurality of time intervals accumulated during iterations of said consensus protocol.

According to one or more embodiments, the first data is representative of the N most recently determined time intervals, with N being an integer greater than one.

According to one or more embodiments, said means for authenticating said second device are configured to authenticate said second device if said second data is equal to the first data.

According to one or more embodiments, said means for authenticating said second device are configured to authenticate said second device if said second data is equal to a hash of the first data.

According to one or more embodiments, the first node device is a non-primary replica node device, the start trigger event is the reception of a transaction request sharing message received from a primary replica node device, and the end trigger event is the reception of a commit decision message (3080, 3090).

According to one or more embodiments, the first node device is a primary replica node device, the second node device is a non-primary node device, the start trigger event is the transmission of a transaction request sharing message by the first node device, and the end trigger event is the reception of a commit decision message from the second node device.

According to one or more embodiments, said consensus protocol is a Practical Byzantine Fault Tolerant, 'P-BFT', consensus protocol.

One or more exemplary embodiments concern a method at a first node device in a blockchain network, said method comprising:
- while carrying out a consensus protocol involving a second node device, in response to a trigger event, obtaining a time interval representative of transmission of a first message to said second node and reception of a second message from said second node device;
- transmitting first data representative of said time interval to said second node device;
- during a subsequent iteration of said consensus protocol involving said second node device, receiving a third message from said second node device, said third message containing second data representative of said time interval from said second node device;
- authenticating said second node device as a function of said second data.

According to one or more embodiments, said first data is representative of a plurality of time intervals accumulated during iterations of said consensus protocol.

According to one or more embodiments, said first data is representative of the N most recently determined time intervals, with N being an integer greater than one.

According to one or more embodiments, said second device is authenticated if said second data is equal to the first data.

According to one or more embodiments, said second device is authenticated if said second data is equal to a hash of the first data.

According to one or more embodiments, the first node is a non-primary replica node, the start trigger event is the reception of a transaction request sharing message received from a primary replica node device, and the end trigger event is the reception of a commit decision message from the second node device.

According to one or more embodiments, the first node is a primary replica node, the start trigger event is the transmission of a transaction request sharing message and the end trigger event is the reception of a commit decision message from the second node device.

One or more exemplary embodiments concern a first node device comprising at least one processor and at least one memory, said memory comprising computer program code, the at least one memory and the computer program code being configured, with the at least one processor, to cause the communication device to at least perform:
- while carrying out a consensus protocol involving a second node device, in response to a trigger event, obtaining a time interval representative of transmission of a first message to said second node and reception of a second message from said second node device;
- transmitting first data representative of said time interval to said second node device;

during a subsequent iteration of said consensus protocol involving said second node device, receiving a third message from said second node device, said third message containing second data representative of said time interval from said second node device;

authenticating said second node device as a function of said second data.

According to one or more embodiments, said first data is representative of a plurality of time intervals accumulated during iterations of said consensus protocol.

According to one or more embodiments, said first data is representative of the N most recently determined time intervals, with N being an integer greater than one.

According to one or more embodiments, said processor, memory and code are further configured cause said first node device to authenticate said second device if said second data is equal to the first data.

According to one or more embodiments, said processor, memory and code are further configured cause said first node device to authenticate said second device if said second data is equal to a hash of the first data.

According to one or more embodiments, the first node is a non-primary replica node, the trigger event is the reception of a transaction request sharing message, the second message is a prepare decision message and the third message is a commit message.

According to one or more embodiments, the first node is a primary replica node, the trigger event is the transmission of a transaction request sharing message, the second message is a prepare decision message and the third message is a commit message.

According to any of the above embodiments, said consensus protocol is a Practical Byzantine Fault Tolerant, 'P-BFT', consensus protocol.

One or more exemplary embodiments concern a non-transitory computer-readable medium storing computer-executable code that, when executed by at least one processor at a communication device, causes the communication device to perform the steps of the methods according to one or more exemplary embodiments disclosed herein.

One or more exemplary embodiments concern a second node device in a blockchain network, said second node device comprising:

means for carrying out a consensus protocol involving a first node device;

means for receiving, from the first node device, first data representative of a time interval function of a time interval start trigger event and of a time interval end trigger event (3080) wherein each event is linked to a respective message of the consensus protocol and wherein at least the end trigger event comprises receiving by the first device a message sent by the second node device;

means for during a second iteration of said consensus protocol, transmitting second data (function of said first data to allow authentication of said second node device by said first node device.

According to one or more embodiments of the second node device, the second node device is a primary replica node device, the first node device is a non-primary replica device, said second node device further comprises means for sending the second data function of said first data as part of a share request message.

According to one or more embodiments of the second node device, the second node device is a non-primary replica node device, further comprising means for sending the second data function of said first data as part of a prepare decision message.

According to one or more embodiments of the second node device, said second data is equal to first data received during one or more iterations of said consensus protocol; or said second data is obtained by applying a hash function to first data received during one or more iterations of said consensus protocol.

According to one or more embodiments of the second node device, said second node device further comprises means for checking by the second node device that a variation of a delay between the trigger events leads to a variation in a same direction of said first data.

One or more exemplary embodiments concern a second node device in a blockchain network, said second node device comprising:

means for carrying out a consensus protocol involving a first node device;

means for receiving, from the first node device, first data representative of a time interval function of a time interval start trigger event and of a time interval end trigger event (3080) wherein each event is linked to a respective message of the consensus protocol and wherein at least the end trigger event comprises receiving by the first device a message sent by the second node device;

means for during a second iteration of said consensus protocol, transmitting second data (function of said first data to allow authentication of said second node device by said first node device.

According to one or more exemplary embodiments, the second node device is a primary replica node device, the first node device is a non-primary replica device, the second node device further comprising means for sending the second data function of said first data as part of a share request message.

According to one or more exemplary embodiments of the second node device, the second node device is a non-primary replica node device, the second node device further comprising means for sending the second data function of said first data as part of a prepare decision message.

According to one or more embodiments of the second node device, said second data is equal to first data received during one or more iterations of said consensus protocol;

or said second data is obtained by applying a hash function to first data received during one or more iterations of said consensus protocol.

According to one or more embodiments of the second node device, said second node device further comprises means for checking by the second node device that a variation of a delay between the trigger events leads to a variation in a same direction of said first data.

One or more exemplary embodiments concern a method at a second node device in a blockchain network, said method comprising:

carrying out a consensus protocol involving a first node device;

receiving, from the first node device, first data representative of a time interval function of a time interval start trigger event and of a time interval end trigger event (3080) wherein each event is linked to a respective message of the consensus protocol and wherein at least the end trigger event comprises receiving by the first device a message sent by the second node device;

during a second iteration of said consensus protocol, transmitting second data (function of said first data to allow authentication of said second node device by said first node device.

According to one or more exemplary embodiments of the method at a second node device, the second node device is a primary replica node device, the first node device is a non-primary replica device, said method comprising sending the second data function of said first data as part of a share request message.

According to one or more exemplary embodiments of the method at a second node device, the second node device is a non-primary replica node device, said method comprising sending the second data function of said first data as part of a prepare decision message.

According to one or more embodiments of the method at a second node device, said second data is equal to first data received during one or more iterations of said consensus protocol;

or said second data is obtained by applying a hash function to first data received during one or more iterations of said consensus protocol.

According to one or more embodiments of the method at a second node device, said method further comprises checking by the second node device that a variation of a delay between the trigger events leads to a variation in a same direction of said first data.

One or more exemplary embodiments concern a second node device in a blockchain network, said second node device comprising at least one processor and at least one memory, said memory comprising computer program code, the at least one memory and the computer program code being configured, with the at least one processor, to cause the communication device to at least perform:

carrying out a consensus protocol involving a first node device;

receiving, from the first node device, first data representative of a time interval function of a time interval start trigger event and of a time interval end trigger event (3080) wherein each event is linked to a respective message of the consensus protocol and wherein at least the end trigger event comprises receiving by the first device a message sent by the second node device;

during a second iteration of said consensus protocol, transmitting second data (function of said first data to allow authentication of said second node device by said first node device.

According to one or more embodiments, the processor, memory and code are further configured to cause the second device to carry out the methods described herein and in particular the methods mentioned above.

BRIEF DESCRIPTION OF THE DRAWINGS

Example embodiments will be more fully understood from the detailed description provided herein and the accompanying drawings, which are given by way of illustration only.

It should be noted that these figures are intended to illustrate the general characteristics of methods, structure and/or materials utilized in certain example embodiments and to supplement the written description provided below. These drawings are not, however, to scale and may not precisely reflect the exact structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various exemplary embodiments will now be described more fully with reference to the accompanying drawings. However, specific structural and functional details disclosed herein are merely representative for purposes of describing example embodiments. The exemplary embodiments may be embodied in many alternate forms and should not be construed as limited to only the embodiments set forth herein. It should be understood that there is no intent to limit example embodiments to the particular forms disclosed.

It should be appreciated by those skilled in the art that any functions, engines, block diagrams, flow diagrams, state transition diagrams and/or flowcharts herein represent conceptual views of illustrative circuitry embodying the principles of the exemplary embodiments. Similarly, it will be appreciated that any flow charts, flow diagrams, state transition diagrams, pseudo code, and the like represent various processes which may be substantially represented in computer readable medium and so executed by a computer or processing apparatus, whether or not such computer or processor is explicitly shown.

Each described function, engine, block, step can be implemented in hardware, software, firmware, middleware, microcode, or any suitable combination thereof. If implemented in software, the functions, engines, blocks of the block diagrams and/or flowchart illustrations can be implemented by computer program instructions/software code, which may be stored or transmitted over a computer-readable medium, or loaded onto a general purpose computer, special purpose computer or other programmable processing apparatus and/or system to produce a machine, such that the computer program instructions or software code which execute on the computer or other programmable processing apparatus, create the means for implementing the functions described herein.

In the present description, functional blocks denoted as "means configured to perform . . . " (a certain function) shall be understood as functional blocks comprising circuitry that is adapted for performing or configured to perform a certain function. A means being configured to perform a certain function does, hence, not imply that such means necessarily is performing said function (at a given time instant). Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may be any physical media that can be read, written or more generally accessed by a computer/a processing device. Examples of computer storage media include, but are not limited to, a flash drive or other flash memory devices (e.g. memory keys, memory sticks, USB key drive), CD-ROM or other optical storage, DVD, magnetic disk storage or other magnetic storage devices, solid state memory, memory chip, RAM, ROM, EEPROM, smart cards, a relational database management system, a traditional database, or any other suitable medium that can be used to carry or store program code in the form of instructions or data structures which can be read by a computer processor. Also, various forms of computer-readable medium may be used to transmit or carry instructions to a computer, including a router, gateway, server, or other transmission device, wired (coaxial cable, fiber, twisted pair, DSL cable) or wireless (infrared, radio, cellular, microwave). The instructions may include code from any computer-programming language, including, but not limited to, assembly, C, C++, Basic, SQL, MySQL, HTML, PHP, Python, Java, Javascript, etc. Embodiments of a computer-readable medium include, but are not limited to, both computer storage media and communication media including any medium that facilitates transfer of a computer program from one place to another. Specifically, program instructions or computer readable program code to perform embodiments described herein may be stored, temporarily or permanently, in whole or in part, on a non-transitory computer readable medium of a local or remote storage device including one or more storage media.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

According to example embodiments, network elements, network devices, data servers, network resource controllers, network apparatuses, clients, routers, gateways, network nodes, computers, cloud-based servers, web servers, application servers, proxies or proxy servers, or the like, may be (or include) hardware, firmware, hardware executing software or any combination thereof. Such hardware may include processing or control circuitry such as, but not limited to, one or more processors, one or more CPUs, one or more integrated circuits one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

As used in this application, the term "circuitry" may refer to one or more or all of the following:

(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

One or more non-limiting exemplary embodiments will now be described, in the frame of blockchain replication among peer nodes of a blockchain network. The description of these exemplary embodiments comprises references to so-called consortium blockchains using a Practical Byzantine Fault Tolerant consensus protocol ('P-BFT' protocol). The principles exposed herein may however be applied to other types of blockchains than consortium blockchains as long as message authentication is required. As non-limitative examples of consensus protocols other than P-BFT, one can think of the Leaderless Byzantine Fault Tolerance (LBFT) and Istanbul Byzantine Fault Tolerance (IBFT) protocols.

A blockchain is a linked list of records or blocks in which a block comprises among other things a hash of the previous block, a timestamp and transaction data. A blockchain can record transactions in a permanent and verifiable manner and is typically maintained by a 'blockchain network' i.e. set of network devices or nodes, each of which ideally holds a replica of the blockchain. Protocols commonly applied by the nodes define communication among nodes and addition to the blockchain of a block with a new transaction, following a request by a client device. A new transaction is verified before being accepted into the blockchain. This verification may be based on a consensus protocol, according to which more than a certain number of nodes need to agree to a transaction in order for it to be accepted. In order to provide fault tolerance (whether such a fault has been generated intentionally or not), the consensus protocol allows the nodes to reach a consensus even in the absence of certain nodes (e.g. in case one or more nodes are offline) or when certain nodes do not function properly or provide inconsistent information (e.g. because of a software issue or compromised security). Consortium blockchains such as P-BFT provide a deterministic way to reach consensus and eventually state machine replication. Consortium blockchains can provide strong security properties with reasonable costs in terms of i) number of messages being exchanged among peers and ii) computational overhead.

Figure 1:
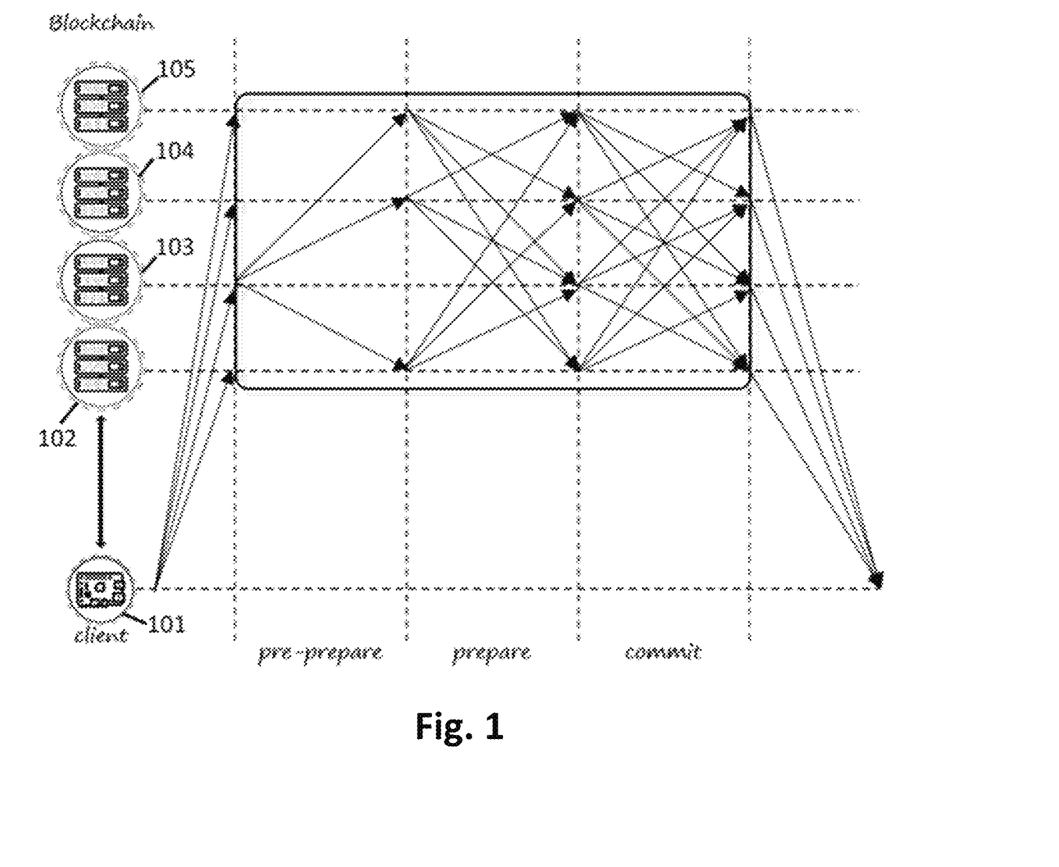
FIG. 1 is a diagram of messages exchanged by network nodes according to blockchain consensus protocol.

FIG. 1 is a diagram schematically showing a client device 101 and nodes 102, 103, 104 and 105 of a blockchain network and the messages exchanged in the different phases of a P-BFT consensus protocol. Nodes in such a context are also called 'replicas', the node with a leading role in the consensus protocol is called 'primary replica' and other nodes are called 'secondary replicas' or 'non-primary' replicas. The term 'replica' itself makes reference to the fact that state machine replication is one of the goals of blockchain technology.

Request: The client device sends a transaction request to all nodes

Pre-Prepare: A set of requests (received from clients) is ordered and submitted by a "primary" node (the blockchain node taking the lead in this consensus round) to all the other nodes. This is the transaction set that will be processed by the consensus protocol during this round.

Prepare: The nodes agree on the order of the transaction set by resubmitting the primary node's message again to all nodes Commit: Another round of consensus is performed where nodes finally decide on the response that has to be sent to the client device. This involves all the nodes sending a message to every other node Response: A response is sent to the client by each node, and each response contains the decision taken by the majority of nodes The primary node may have been designated as such or elected through a separate process that won't be detailed here.

As can be seen in FIG. 1, the number of messages exchanged during the pre-prepare, prepare, and commit phases may become important with a growing number of nodes. To avoid nodes from sending fake or wrong messages, each interaction between nodes should also be authenticated. Authentication can include e.g. PKI Public Key Infrastructure, PKI, and/or message authentication codes, MAC. However, considering the high number of exchanged messages, such solutions, which imply the usage of cryptographic primitives, may be expensive in terms of computational burden and thus may limit the management of P-BFT based blockchains to devices with sufficient processing power, which may include devices such as servers, desktop and laptop computers, tablets but also smart phones. Processing power of some node devices in a blockchain network may however be limited, for example for Internet of Things devices, such as for example sensors, wearables and home automation devices. For portable devices, battery power may also be limited. At least for these reasons, it appears as desirable, limiting the computational burden linked to the authentication steps so that more devices can act as blockchain network nodes for participation in blockchain protocols, and to manage and/or maintain the blockchain without relying on additional, more powerful devices.

According to one or more exemplary embodiments, the entropy embedded within the network layer is applied to derive identification factors that are used to verify the authenticity of received messages between nodes of the blockchain network during the consensus protocol phases. Herein, network delays, which are inherently unpredictable, are used to generate random identification factors which are then used in the authentication process between two devices. As a result, a lightweight consensus protocol is obtained that eliminates the use of standard cryptographic primitives in the authentication of messages after the first cycle. This may allow devices which possess or can devote only limited processing power to a blockchain protocol to participate nevertheless.

Figure 2:
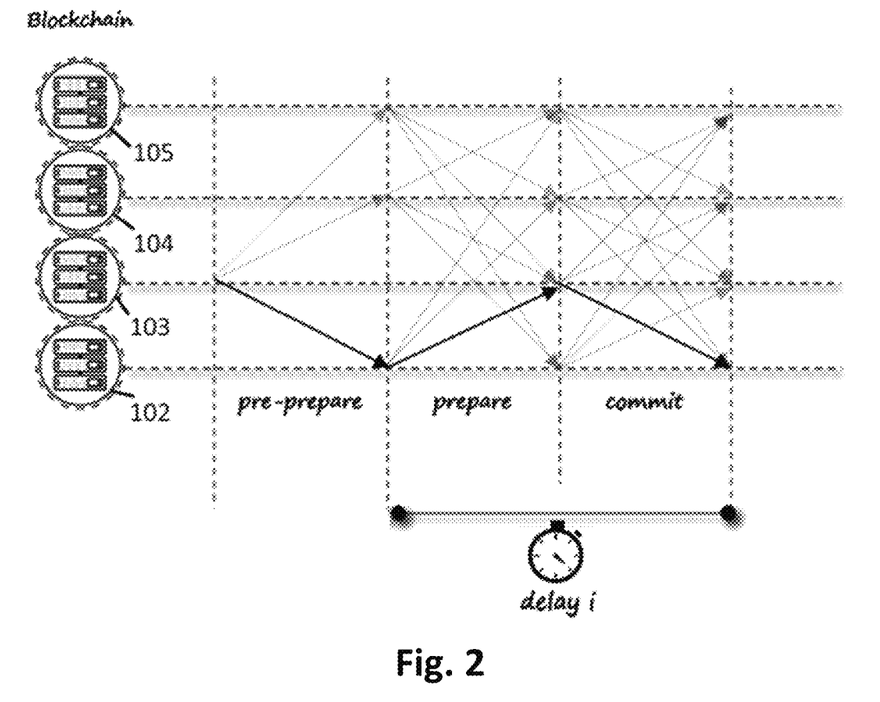
FIG. 2 is a diagram of a subset of the messages of FIG. 1, between a primary node and a given non-primary node.

FIG. 2 is a diagram similar to that of FIG. 1, but showing a subset of messages, specifically one message for each phase of the consensus protocol. During the 'Pre-Prepare' phase, node 103 (acting as primary node) sends a message to node 102. Node 102 then sends a message back to node 103 during the 'Prepare' phase. Lastly, in response, node 103 sends another message to node 102 during the 'Commit' phase.

According to one or more exemplary embodiments, the delay between a first node receiving a message from a second node, the first node sending a message to the second node and the first node receiving a message in return from the second node is used within the authentication process between these two nodes. In FIG. 2, this corresponds to the combination of the prepare and commit phases.

Figure 3A:
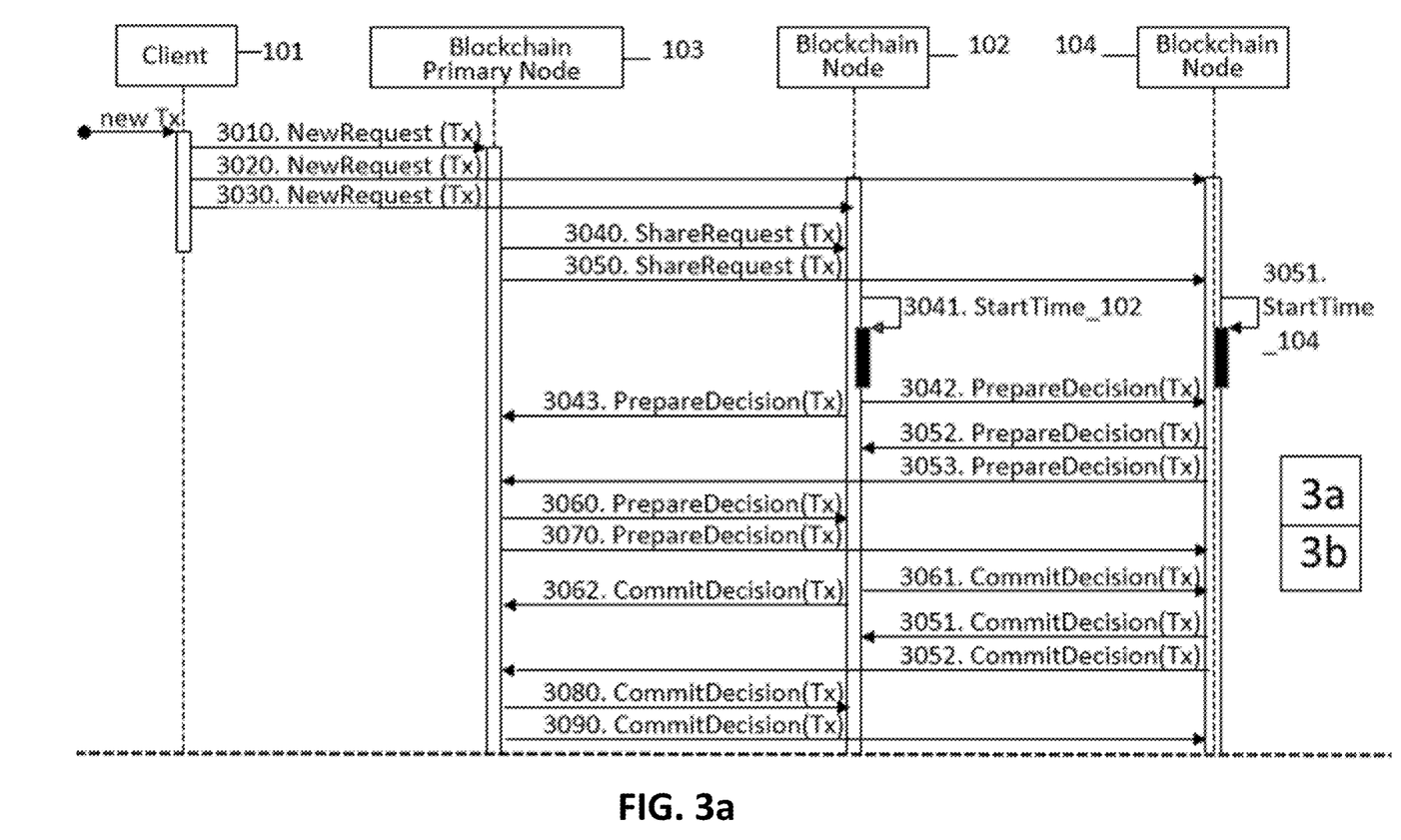
FIG. 3a and FIG. 3b are upper and lower parts of a message sequence diagram according to one or more exemplary embodiments.
Figure 3B:
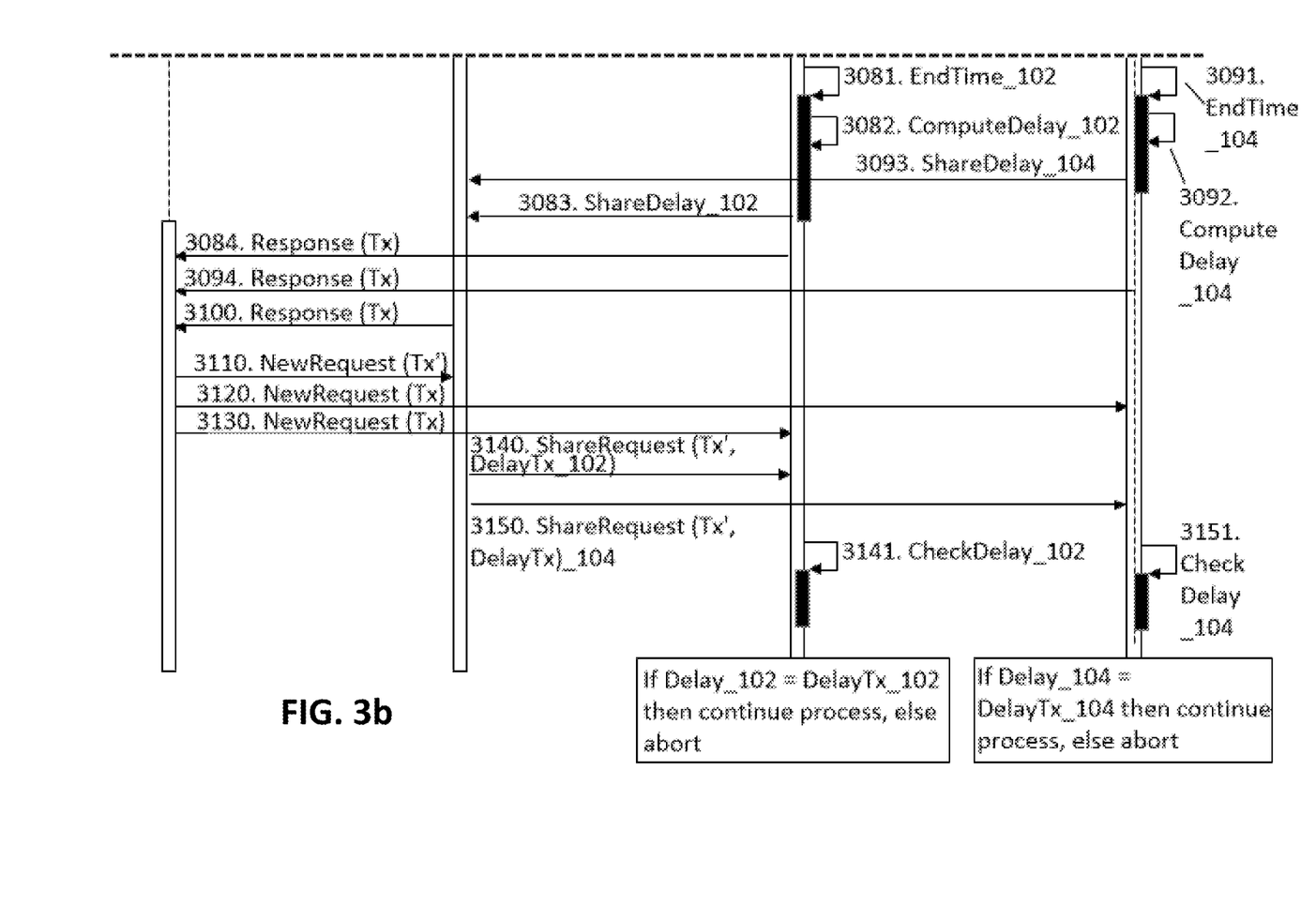

FIG. 3a and FIG. 3b (referred to jointly as FIG. 3a/b in what follows) represent a message sequence diagram illustrating one or more exemplary embodiments of a network delay based authentication protocol. The diagram of FIG. 3a/b represents the exchanges between of the four devices of FIG. 1, e.g. the client device 101 and three blockchain node devices 102 to 104. It is supposed that device 105 is for example offline.

As previously explained, the client device 101 initializes the process in a 'Pre-Prepare' phase by transmitting a new transaction request to all other nodes—the corresponding messages, (called 'NewRequest (Tx)' in the flowchart) are labelled 3010, 3020 and 3030 in FIG. 3a/b. Then starts the pre-prepare phase, during which the primary node (again node 103 in the present case) shares the transaction request with the remaining (i.e. non-primary) nodes 102 and 104 (messages 'ShareRequest (Tx)' 3040 and 3050).

The reception of the ShareRequest messages by non-primary nodes 102 and 104 triggers recording of an internal clock value at these nodes ('StartTime_102' and 'StartTime_104', respectively at steps 3041 and 3051).

During the 'Prepare' phase, each of the blockchain nodes 102, 102 104 then re-broadcasts the transaction to all other blockchain nodes in further messages (called 'PrepareDecision (Tx)' in the flowchart). The messages sent by node 102 are messages 3042 and 3043. The messages sent by node 103 are messages 3060 and 3070. The messages sent by node 104 are messages 3052 and 3053.

During the 'Commit' phase, each of the blockchain nodes broadcasts another message (called 'CommitDecision (Tx)' in the flowchart) to all other blockchain nodes. These messages are respectively referenced 3051, 3052, 3061, 3062, 3080 and 3090.

After reception of the 'CommitDecision (Tx)' messages from the primary node, each node has received at least two messages from every other node (i.e. the PrepareDecision and CommitDecision messages). Non-primary nodes 102 and 104 record their respective internal clock values at steps 3081 and 3091 ('EndTime_102' and 'EndTime_104, respectively at steps 3081 and 3091) and, at steps 3082 and 3092, compute respective delays Delay_102 and Delay_104 resulting from the differences of clock values at start and end times. In the frame of the present exemplary embodiment, this delay is representative of the time interval covering the interaction of a non-primary node with the primary node during a three-way handshake protocol. In the frame of the example of FIG. 3a/b, this is the delay between the reception of the ShareRequest (TX) message and the reception of the CommitDecision (TX) message from the primary node. Each non-primary node transmits its delay value to the primary node (messages 'ShareDelay_102' and 'ShareDelay_104' at respective steps 3083 and 3093). Non-primary nodes also store their delay value. The primary node stores a delay value along with an identifier of the node that provided the delay value, in order to be able to retrieve the right delay value for its future communications with this particular node.

According to a variant embodiment, standard cryptographic primitives are used for authentication during the first cycle between two nodes.

According to a variant embodiment, the delays are obtained from respective timers that are started and stopped respectively at steps 3041, 3051, respectively 3081, 3091.

According to a variant embodiment, the start of the delay is triggered by a node somewhere between the reception of a ShareRequest (TX) message by the node and the transmission of PrepareDecision (TX) messages by this node, i.e. it need not fall exactly on the reception of the ShareRequest (TX) message but linked to this reception. The exact triggering strategy may differ from node to node. A similar approach may be applied to the determination of the end of the delay, which need not fall exactly on the reception of the CommitDecision (TX) message but may be determined some time later.

All blockchain nodes send a response to the client device containing their decision concerning the transaction request in 'Response (TX)' messages 3084, 3094 and 3100.

When a new request is received by the nodes from the client ('NewRequest (Tx')' messages 3110, 3120, 3130), the primary node includes an identification factor of the non-primary node in the ShareRequest message for this new transaction Tx' that it sends to the given primary node (messages 'ShareRequest (Tx', DelayTx)). In the example of FIG. 3a/b, this identification factor is the previously received delay value. The primary node thus makes reference to an identification factor received from that given node during a previous consensus protocol cycle. This delay value forms this identification factor, or identity, of the non-primary node. The given non-primary node carries out a check (step 3141 for node 102 or step 3151 for node 104) as to whether the delay value received from the primary node is the same as the one it has in memory. If that is the case, the primary node is authenticated, and the consensus protocol is pursued by the non-primary node. Else, the consensus protocol is aborted by the non-primary node.

Although this is not shown in FIG. 3a/b, the primary node may include respective identification factors of non-primary nodes into any of its messages to these non-primary nodes, not only the ShareRequest messages, to allow authentication by the non-primary nodes for each message.

According to one or more embodiments, an identification factor used by a node to authenticate another node it communicates with may be function of more than one delay value. For example, the identification factor may be function of delay values accumulated over several communication cycles or consensus protocol cycles. As one non-limitative example, N delay values may be accumulated in a sliding window, with N being an integer equal or greater than 1. The authenticating node (i.e. the non-primary node, in the case of the example of FIG. 3a/b) would still send only one delay value per 'Prepare' and 'Commit' phase cycle to the node to be authenticated (i.e. the primary node in the example of FIG. 3a/b). Both nodes accumulate the delay values these in the same manner. This reinforces security since an eavesdropping device would need to be able to carry out the same accumulation over a plurality of consensus protocol cycles.

Figure 4:
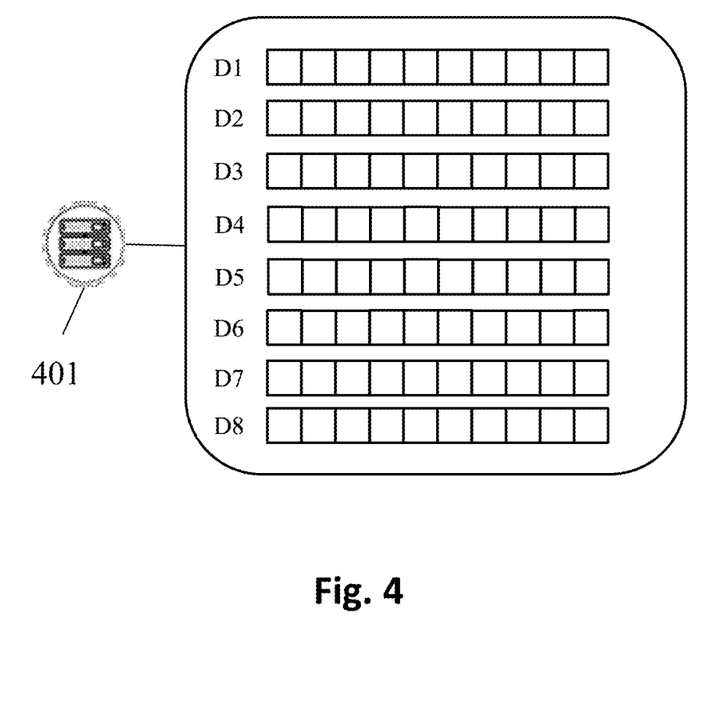
FIG. 4 is a schematic diagram representing identification data exchanged by two nodes.

The N delay values may be stored in the form of a matrix. FIG. 4 shows an example of such a matrix stored by a node 401, in which each line corresponds to a delay value Di generated during a cycle i. In this non-limitative example, each delay value comprises 10 bits. Node 401 may be the authenticating node or the node to be authenticated.

According to a variant embodiment, M delay values are transmitted by an authenticating node to a node to be authenticated, with M smaller than N, and the M delay values being chosen according to a scheme known by both nodes.

According to a variant embodiment, the node which is to be authenticated sends its entire delay value matrix as identification factor (i.e. M=N with regard to the previous paragraph).

According to a variant embodiment, the node to be authenticated sends a hash of at least one delay value and the authenticating node compares the received hash to a hash of the same at least one delay values it has in memory. Such a hash may for example be obtained by carrying out an XOR between two or more delay values when a plurality of values are considered. Other hash functions are known to the Person Skilled in the Art, including hash functions applicable to a single delay value. Sending a hash value from the node to be authenticated to the authenticating node may reduce the quantity of data sent compared to sending one or more delay values or the entire matrix in extenso.

According to one or more embodiment, the node to be authenticated checks whether variations in the time between the messages triggering the start and the end of the delay at the authenticating node lead to variations in the same direction (i.e. increase or decrease) of the delay value Di obtained by the node to be authenticated. For example, the node to be authenticated can in particular delay sending the Commit Decision message to create such variations.

While the message sequence diagram of FIG. 3a/b. focuses on the authentication of a non-primary node by the primary node, a similar protocol can be applied to the interactions between any couple of nodes in order to provide authentication.

For example, when considering two non-primary nodes, the start of the network delay at one or both of these nodes may be linked to the reception of the ShareRequest (TX) message from the primary node, and the end of the delay may be linked at a node to the reception of the CommitDecision (TX) message from the other node. When the node to determine a network delay is the primary node itself, the start of the time interval may be linked for example to the primary node sending the ShareRequest (TX) message.

While these are not three-way handshake protocols per se as described in conjunction with FIG. 3 since three devices are involved, the start and end of the time interval are derived in a similar fashion. Once the delays are determined, ShareDelay (TX) messages for the above cases may be transmitted after the 'Commit' phase, just as in the example of FIG. 3. A node having received ShareDelay (TX) messages from one or more other nodes will then be able to include a respective identification factor in any message it sends to any of these one or more nodes.

Figure 5:
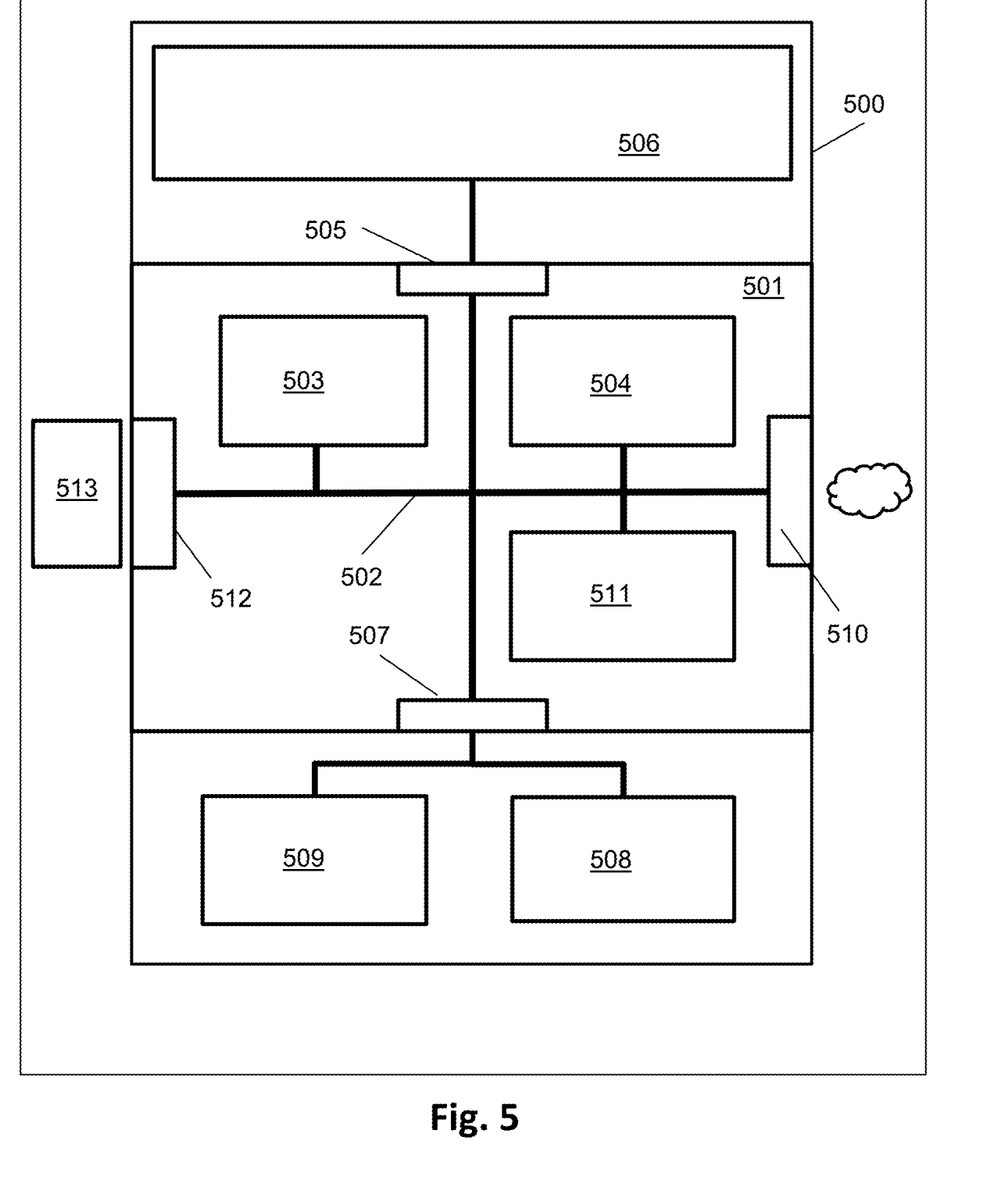
FIG. 5 is a schematic block diagram network device according to one or more exemplary embodiments.

FIG. 5 is a block diagram of a device 500 that, according to an exemplary embodiment, can be used to implement a blockchain node device. The device 500 comprises a printed circuit board 501 on which a communication bus 502 connects a processor 503, a random access memory 504, a storage medium 511, an interface 505 for connecting a display 506, a series of connectors 507 for connecting user interface devices or modules such as a mouse or trackpad 508 and a keyboard 509, a wireless network interface 510 and a wired network interface 512. Depending on the functionality required, a node device may implement only part of the above. Certain modules of FIG. 5 may be internal or connected externally, in which case they do not necessarily form integral part of the device itself. E.g. display 506 may be a display that is connected to a device only under specific circumstances, or the device may be controlled through another device with a display, i.e. no specific display 506 and interface 505 are required for such a device. Memory 511 contains software code which, when executed by processor 503, causes the device to perform the methods described herein. Storage medium 513 is a detachable device such as a USB stick which holds the software code which can be uploaded to memory 511.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

The invention claimed is:

1. A first node device in a blockchain network, comprising:
   at least one processing core,
   at least one memory including computer program code, the at least one memory and the computer program code being configured to, with the at least one processing core, cause the first node device to:
   while carrying out a first iteration of a consensus protocol involving a second node device, in response to a trigger event, obtain a time interval function of a time interval start trigger event and of a time interval end trigger event, each of the time interval start trigger event and the time interval end trigger event being linked to a message of the consensus protocol and wherein at least the end trigger event comprises receiving a message from the second node device;
   transmit first data representative of said time interval function to said second node device;
   during a subsequent iteration of said consensus protocol involving said second node device, receive a message from said second node device, said message containing second data representative of said time interval function from said second node device;
   authenticate said second node device as a function of said second data.

2. The first node device according to claim 1, wherein said first data is representative of a plurality of time intervals accumulated during iterations of said consensus protocol.

3. The first node device according to claim 2, wherein said first data is representative of N most recently determined time intervals, with N being an integer greater than one.

4. The first node device according to claim 1, is further configured to authenticate said second node device if said second data is equal to the first data.

5. The first node device according to claim 1, is further configured to authenticate said second node device if said second data is equal to a hash of the first data.

6. The first node device according to claim 1, wherein the first node device is a non-primary replica node device, the start trigger event is the reception of a transaction request sharing message received from a primary replica node device, and the end trigger event is the reception of a commit decision message.

7. The first node device according to claim 1, wherein the first node device is a primary replica node device, the second node device is a non-primary node device, the start trigger event is the transmission of a transaction request sharing message by the first node device, and the end trigger event is the reception of a commit decision message from the second node device.

8. A method at a first node device in a blockchain network, said method comprising:

while carrying out a first iteration of a consensus protocol involving a second node device, obtaining a time interval function of a time interval start trigger event and of a time interval end trigger event, each of the time interval start trigger event and the time interval end trigger event being linked to a message of the consensus protocol and wherein at least the end trigger event comprises receiving a message from the second node device;

transmitting first data representative of said time interval function to said second node device;

during a subsequent iteration of said consensus protocol involving said second node device, receiving a message from said second node device, said message containing second data representative of said time interval function from said second node device;

authenticating said second node device as a function of said second data.

9. The method according to claim 8, wherein said first data is representative of a plurality of time intervals accumulated during iterations of said consensus protocol.

10. The method according to claim 9, wherein said first data is representative of N most recently determined time intervals, with N being an integer greater than one.

11. The method according to claim 8, wherein said second node device is authenticated if said second data is equal to the first data.

12. The method according to claim 8, wherein said second node device is authenticated if said second data is equal to a hash of the first data.

13. The method according to claim 8, wherein the first node is a non-primary replica node device, the start trigger event is the reception of a transaction request sharing message received from a primary replica node device, and the end trigger event is the reception of a commit decision message from the second node device.

14. The method according to claim 8, wherein the first node device is a primary replica node, the start trigger event is the transmission of a transaction request sharing message and the end trigger event is the reception of a commit decision message from the second node device.

15. A second node device in a blockchain network, comprising:
   at least one processing core,
   at least one memory including computer program code, the at least one memory and the computer program code being configured to, with the at least one processing core, cause the first node device to:
   carry out a consensus protocol involving a first node device;
   receive, from the first node device, first data, wherein the first data is representative of a time interval function of a time interval start trigger event and of a time interval end trigger event, wherein each of the time interval start trigger event and the time interval end trigger event is linked to a respective message of the consensus protocol and wherein at least the end trigger event comprises receiving by the first node device a message sent by the second node device;
   during a second iteration of said consensus protocol, transmit second data to allow authentication of said second node device by said first node device.

16. The second node device according to claim 15, is a non-primary replica node device.

17. The second node device according to claim 15, is further configured to send the second data as part of a prepare decision message.

18. The second node device according to claim 15, wherein said second data is equal to first data received during one or more iterations of said consensus protocol; or said second data is obtained by applying a hash function to first data received during one or more iterations of said consensus protocol.

19. The second node device according to claim 15, is further configured to check that a variation of a delay between the trigger events leads to a variation in a same direction of said first data.

* * * * *